(12) United States Patent  
Nicolai

(10) Patent No.: US 8,043,185 B2  
(45) Date of Patent: Oct. 25, 2011

(54) MULTIPLE GEAR TRANSMISSION WITH MAGNETIC CONTROL

(76) Inventor: Karlheinz Nicolai, Luebbrechtsen (DE)

( * ) Notice: Subject to any disclaimer, the term of this patent is extended or adjusted under 35 U.S.C. 154(b) by 857 days.

(21) Appl. No.: 12/052,182

(22) Filed: Mar. 20, 2008

(65) Prior Publication Data

US 2008/0234090 A1  Sep. 25, 2008

(30) Foreign Application Priority Data

Mar. 21, 2007 (DE) .......................... 10 2007 013 444

(51) Int. Cl.
*F16H 48/06* (2006.01)
(52) U.S. Cl. .................... 475/154; 475/156; 475/157
(58) Field of Classification Search .................. 475/149, 475/154, 156, 157
See application file for complete search history.

(56) References Cited

U.S. PATENT DOCUMENTS

| | | | |
|---|---|---|---|
| 4,158,316 A | 6/1979 | Strong | |
| 4,955,247 A | 9/1990 | Marshall | |
| 5,553,510 A | 9/1996 | Balhorn | |
| 5,871,412 A | 2/1999 | Moser | |
| 5,924,950 A | 7/1999 | Pusic | |
| 6,146,296 A | 11/2000 | Apostolo | |
| 7,726,455 B2 * | 6/2010 | Benoit et al. ............... | 192/84.31 |
| 2003/0192763 A1 * | 10/2003 | Inoue et al. ................. | 192/48.2 |
| 2004/0021390 A1 * | 2/2004 | Kim et al. .................... | 310/191 |
| 2004/0066017 A1 | 4/2004 | Dratewski | |
| 2004/0067804 A1 | 4/2004 | Dratewski | |
| 2004/0144609 A1 * | 7/2004 | Schneider et al. ............ | 192/14 |
| 2007/0267269 A1 * | 11/2007 | Benoit et al. ................ | 192/84.8 |

FOREIGN PATENT DOCUMENTS

| | | |
|---|---|---|
| CH | 167867 | 3/1933 |
| DE | 2020 178 | 4/1971 |
| DE | 103 39 207 | 6/2005 |
| WO | 2006/039880 | 4/2006 |

* cited by examiner

*Primary Examiner* — Ha D. Ho
(74) *Attorney, Agent, or Firm* — Andrew M. Calderon; Roberts Mlotkowski Safran & Cole, P.C.

(57) ABSTRACT

A multiple gear transmission with magnetic control for vehicles or for use in drive technology includes an input shaft supported on a frame and an output shaft. The input shaft protrudes from the frame at least one end and the output shaft protrudes from the frame at one end. Transmission gear ratios with transmission wheels are embodied as gear trains or belt and chain drives and are located between the input shaft and the output shaft. Transmission wheels are supported in a rotatable manner on the input shaft or on the output shaft. The transmission wheels are connected to the input shaft or the output shaft in a torsionally fixed manner by a clutch mechanism. The transmission wheels are constantly in rotation during operation. A state of the clutch mechanism changes through the change of an additional magnetic field inside or in a direct vicinity of the clutch mechanism.

35 Claims, 11 Drawing Sheets

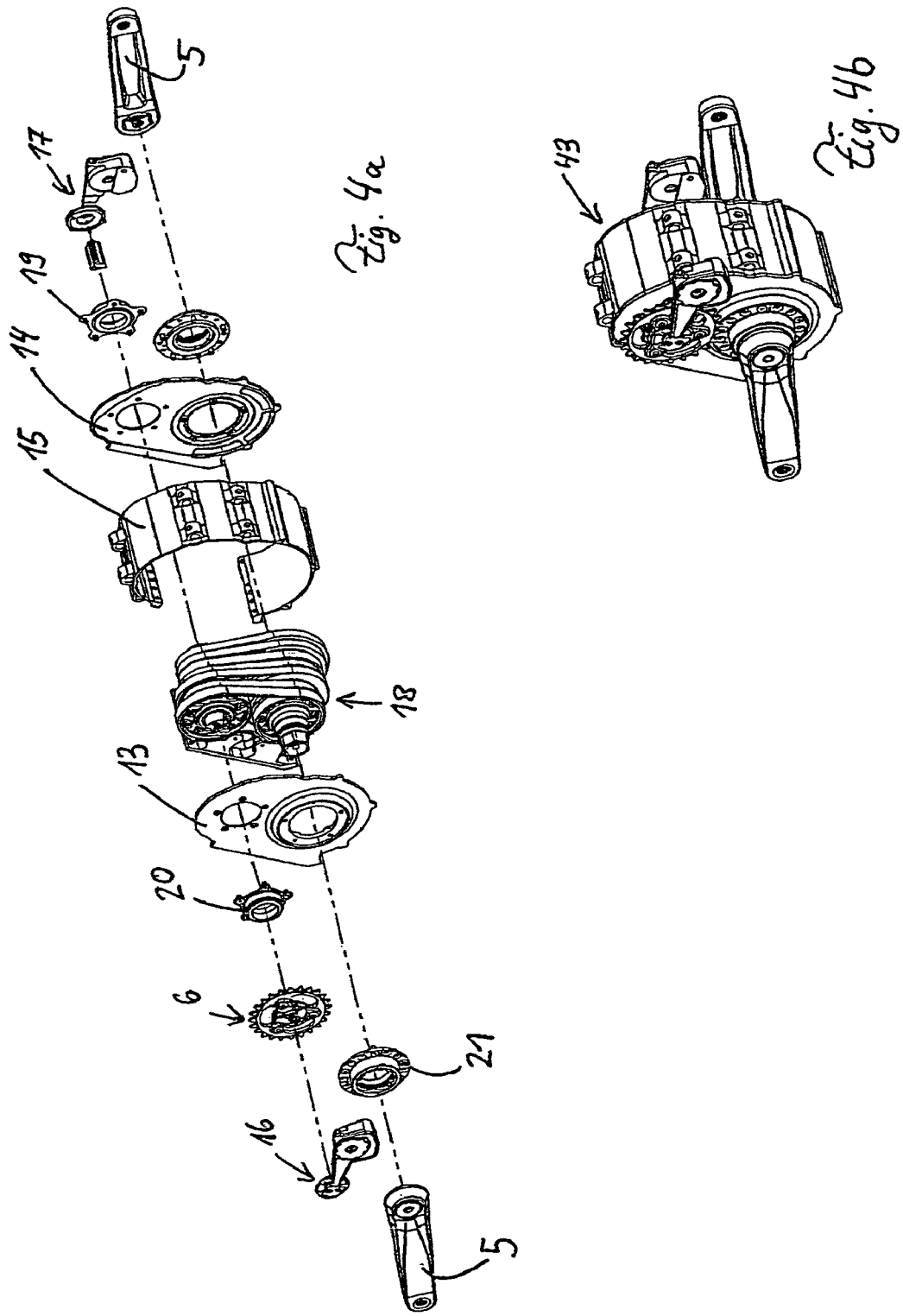

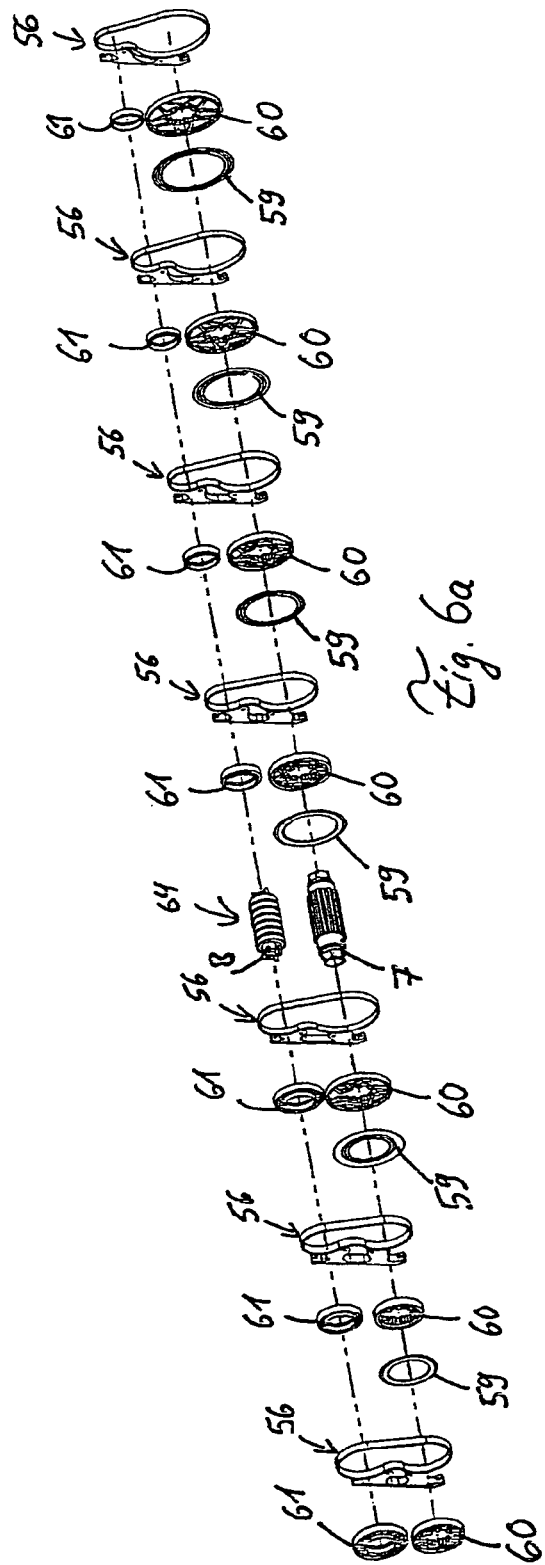
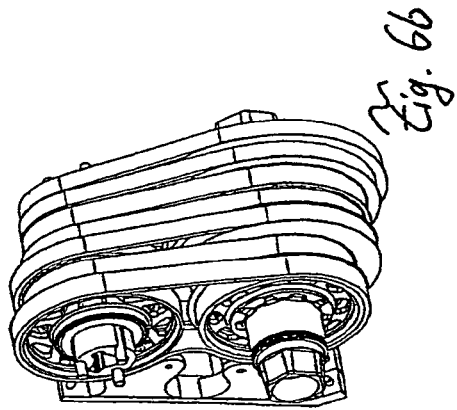

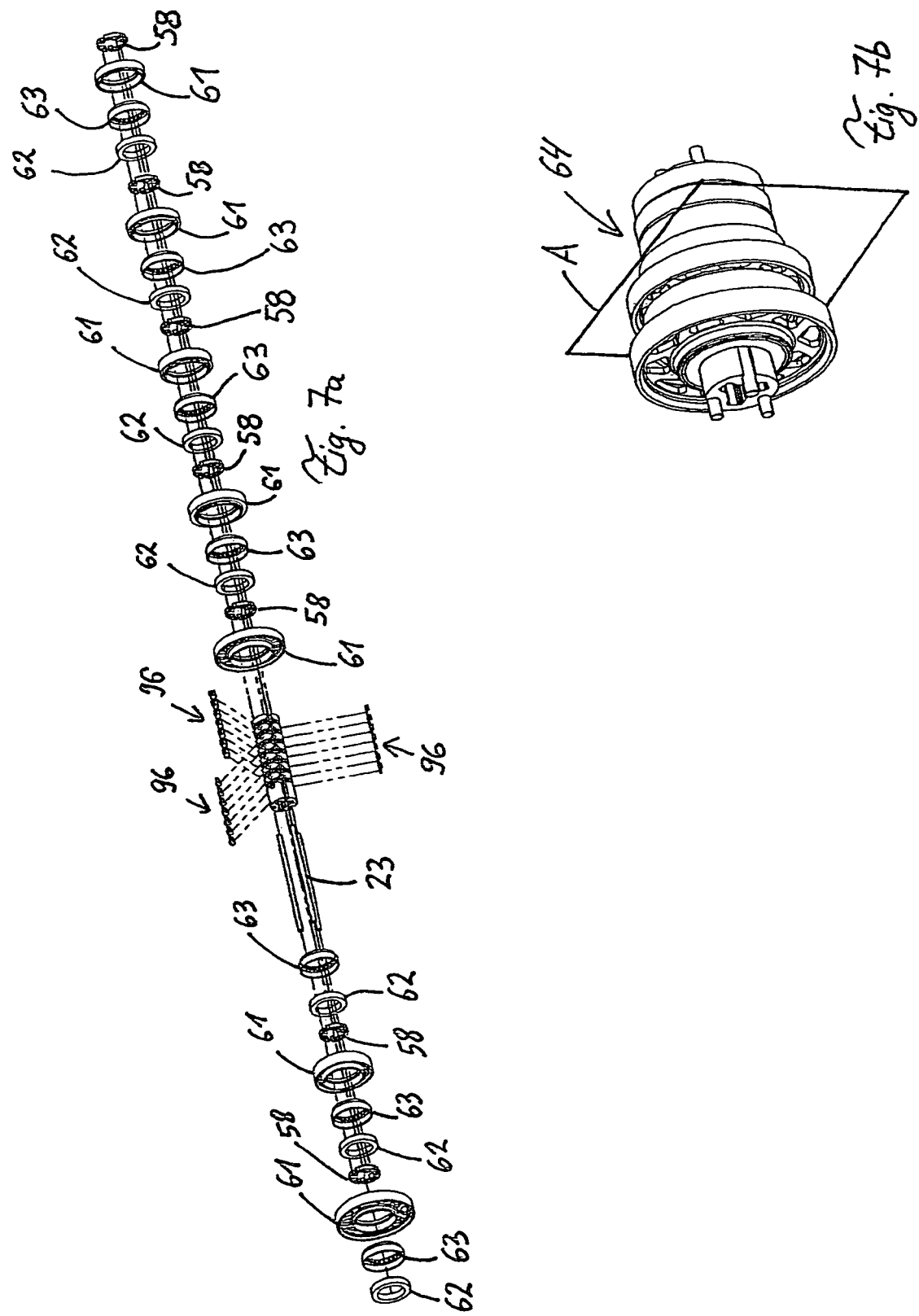

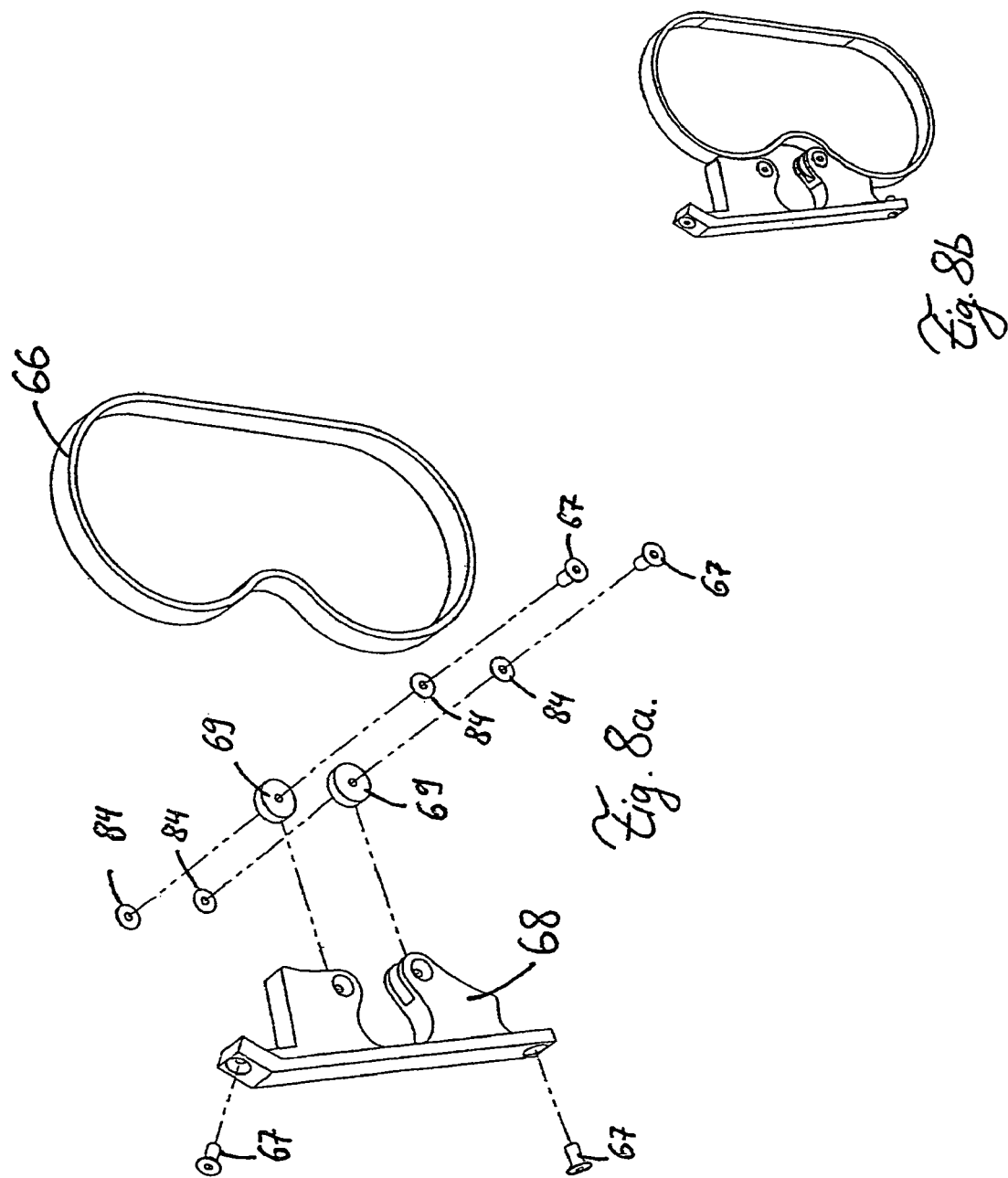

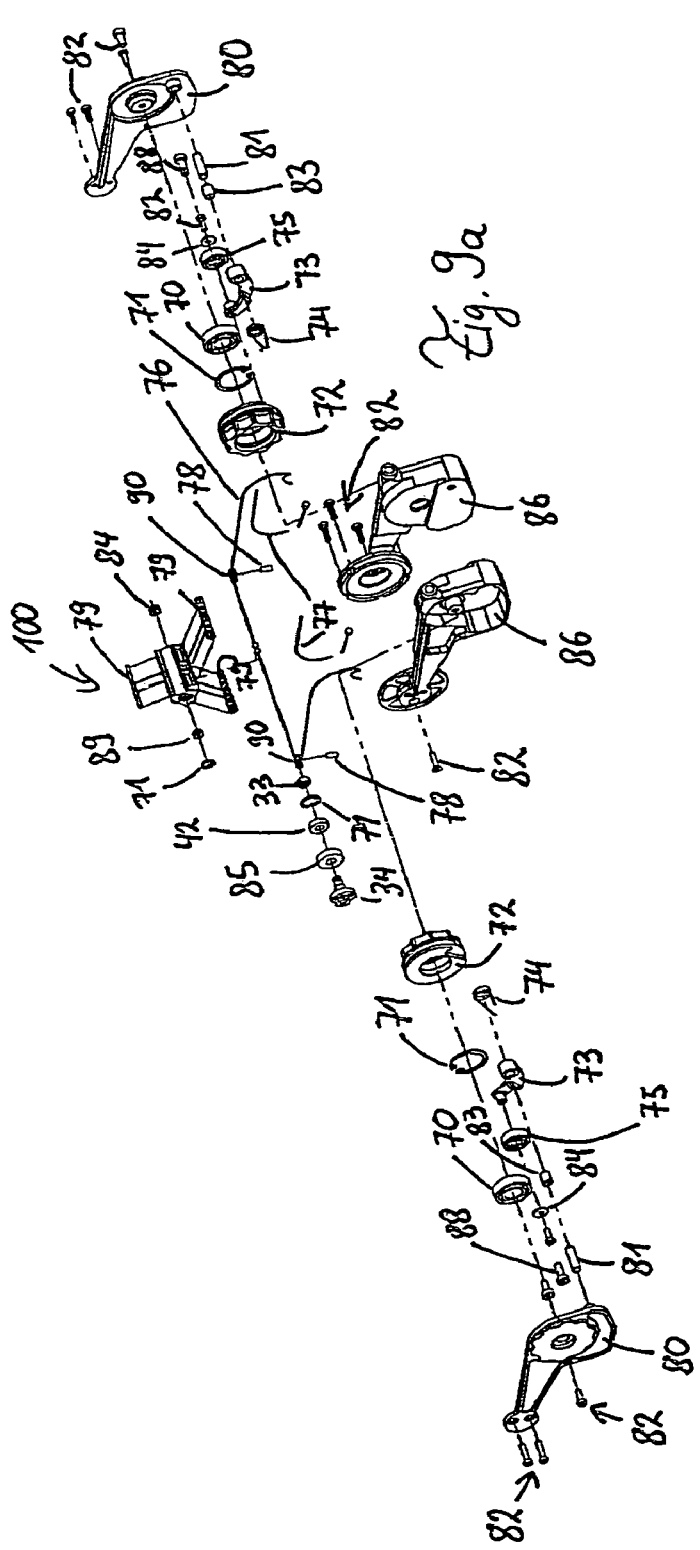
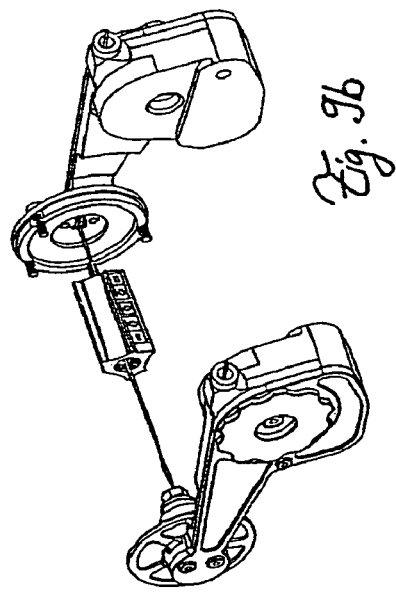

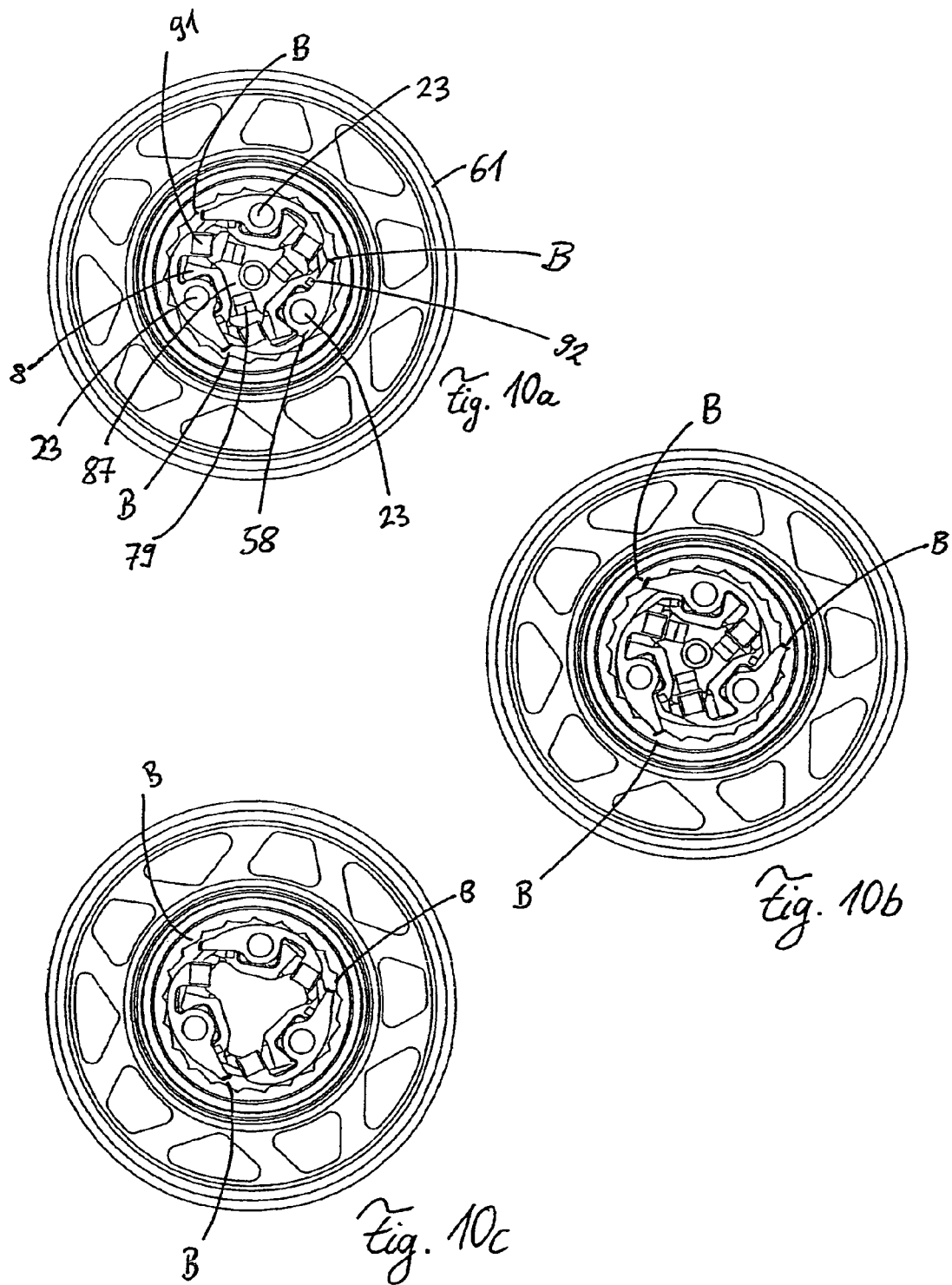

MULTIPLE GEAR TRANSMISSION WITH MAGNETIC CONTROL

CROSS-REFERENCE TO RELATED APPLICATIONS

The present application claims priority under 35 U.S.C. §119 of German Patent Application No. 10 2007 013 444.6, filed on Mar. 21, 2007, the disclosure of which is expressly incorporated by reference herein in its entirety.

BACKGROUND OF THE INVENTION

1. Field of the Invention

The invention relates to a multiple gear transmission with magnetic control for vehicles or for use in drive technology with an input shaft supported on a frame and an output shaft, the input shaft and the output shaft protruding from the frame.

2. Discussion of Background Information

For the past 100 years it has been impossible to imagine the field of motorized vehicles without manual transmissions. They are also used in numerous machines in drive technology. These are very often transmission constructions that operate with the aid of gear wheels as a spur gear transmission or planetary gear train. However, the production engineering of these transmissions is generally very complex and expensive.

Since these power transmitting transmission components are generally made of steel, the weight is currently increasingly the focus of criticism and should be seen as a disadvantage. Lighter transmissions would reduce energy consumption, for example.

Ground vehicles, aircraft and watercraft should be seen by way of example here which may be equipped with internal combustion engines, electric motors or other units. Likewise a use in vehicles that are driven by muscular energy is conceivable. In order to guarantee easy propulsion, the vehicles must be extraordinarily light. The functional description of the transmission for this reason will provided using a bicycle by way of an illustrative example.

In the past forty years the chain drive with a shifting capability at the rear axle has become widely used with bicycles. To this end, a rotatable bottom bracket with one or more chain rings is mounted onto the frame which forms the load-bearing component of the bicycle with all its receiving points for the front wheel fork, the seat post and the rear wheel. A cassette comprising up to ten sprockets of different sizes is located on the hub of the rear wheel. At one dropout located directly at the rear axle a rear derailleur is installed, which has the task of guiding the chain in the sprockets of the cassette and to render possible shifting processes. Through a front derailleur that is usually installed at the seat tube it is possible to switch between the various chain rings at the bottom bracket. The capability of shifting allows the rider to adapt the gear ratio of his/her drive to the respective riding situation. Bicycles with a shifting system as described above are generally referred to as bicycles with derailleur gears.

As the components are mounted outside on the frame for constructional reasons with a bicycle with derailleur gears, the components are particularly exposed to environmental influences. Dirt and water thus come into contact with the rear derailleur, chain, cassette and other components in an unobstructed manner. This drastically reduces the efficiency of the derailleur gears, which is initially very good. For this reason, a considerable part of the force must be used to overcome the resistance within the shifting system.

In order to ensure functionality it is necessary to regularly service the components of the derailleur gears, which includes cleaning and greasing the components and adjusting them precisely. This adjustment can easily change, e.g., with falls or contact with objects (stones, branches, etc.). As tiny dirt particles always remain in the shifting system and in particular in the bearings even with the most intensive servicing, some parts need to be replaced regularly. In particular the parts susceptible to wear, such as chain rings and chain require an annual replacement, which in turn incurs additional expenses.

Shifting with derailleur gears is possible only with rotating sprockets, since otherwise the chain cannot be changed. It is therefore to be seen as a disadvantage that switching at stop is impossible due to the structural design. Furthermore, components can be damaged or torn off the frame with a fall or contact with stones or branches or other objects. The listed circumstances are to be seen as a disadvantage of derailleur gears.

Alternatively to the derailleur gears, the so-called "integral rear hub" was developed in which the shifting processes take place in a transmission in the rear wheel hub. The parts required with the derailleur gears, i.e., rear derailleur, front derailleur and cassette are thus omitted. Bicycles of this type are generally called bicycles with integral rear hub. An integral rear hub thus avoids the disadvantages of derailleur gears.

Because of the transmission integrated into the rear wheel hub, however, the weight of the rear wheel increases. In particular with so-called mountain bikes, which are moved off-road, an increase in mass at the rear wheel becomes highly noticeable. This applies in particular to bicycles with rear wheel suspension. The ratio of sprung to unsprung mass is of decisive importance for the riding behavior of a sprung wheel. The larger the unsprung mass is in relation to the sprung mass, the more critical is the riding behavior of the wheel. With high unsprung mass (heavy rear wheel) thrusts caused by road bumps cannot be compensated for in an optimum manner by the chassis.

With a known bicycle (cf. DE 103 39 207) the transmission is located within the bicycle frame. The bottom bracket shell of the classic bicycle frame is omitted and replaced by the transmission housing. This is a joint housing for the transmission and bottom bracket. Similar to the bicycles with the transmission hub, the power is transmitted to the rear wheel via a chain or a toothed belt, where the chain and the rear wheel hub do not have a shifting function with this system. The rear wheel hub can thus be built in a very light manner, which results in a more efficient rear wheel suspension. Furthermore, the center of gravity shifts to the center of the bicycle, directly below the rider, which results in a more agile and controlled riding behavior. In addition, the so-called "platform strategy" can be used with the aid of the transmission integrated into the frame.

It has been customary in bicycle construction to first build a frame and then to equip it with its components; however, the concept of the transmission integrated into the frame renders it possible for the first time to use the platform strategy known from automobile construction in bicycle production. For example components, such as the shifting system, suspension, the complete power transmission, brakes, generator and lighting are firmly installed in the transmission housing as a platform. The customer-specific parts, which complete the bicycle according to customer or manufacturer specification, are then mounted to the transmission thus equipped.

The transmission according to DE 103 39 207 comprises a planetary transmission and a primary drive. The primary drive is necessary because the planetary transmission developed for use in a transmission hub does not withstand the high torque acting in the bottom bracket. The primary drive brings the planetary transmission to a higher rotational speed, so that it can withstand the acting forces. This construction, however, lowers the efficiency of the drive. This is to be seen as a disadvantage.

Likewise similar transmissions are known, e.g., from U.S. Pat. No. 5,553,510, U.S. Pat. No. 4,955,247, U.S. Pat. No. 5,924,950, DE 2020178U1, WO 2006/039880 A1, US 2004/0067804 A1 and US 2004/0066017 A1. These designs are generally very heavy and complex. One of the shafts is generally the drive shaft and another shaft is the driven shaft. The drive shaft is also referred to below as the input shaft. The driven shaft is also referred to below as the output shaft. If only the term shaft is used below, either the input or the output shaft is meant.

A chain-drive transmission is known, e.g., from U.S. Pat. No. 4,158,316. In this transmission several sprockets with different diameters are rotatably mounted on the axle. The sprockets can be locked in a rotationally fixed manner to the shaft by a coupling and thus transmit a torque. The disadvantage of this lies in the high weight, in particular through the use of a steel chain, and through the large space required, the complexity of the couplings and the coupling control.

A similar chain-drive transmission is known, e.g., from US 2004/0067804 A1 and US 2004/0066017 A1. In these bicycle transmissions various drive wheels are mounted on the input shaft and output shaft, which wheels are connected in pairs to drive mechanisms. Different gear ratios are achieved in that a shifting component inside the drive shaft is axially displaced with the aid of a cable. A connection element on the shifting component engages in the desired drive wheel and generates a rotationally fixed connection between the driven shaft and the drive wheel. However, the described structure has disadvantages, which will be described in more detail below.

Both U.S. Publications, e.g., US 2004/0067804 A1 and US 2004/0066017 A1, disclose that the drive wheels are arranged next to one another such that they form the shape of a conical envelope. The shape of a conical envelope is formed when the diameter of the drive wheels increases from small to large on the shaft. This special feature of US 2004/0067804 A1 and US 2004/0066017 A1 is in fact to be regarded as a disadvantage:

Gear ratios on bicycles should increase speed in the range of 0.7-4.0. Considering the size of the sprocket wheels and their number of teeth in US2004/0067804 A1 and US2004/0066017 A1, this range of gear ratios will be difficult to achieve. Furthermore, considered in terms of sports biology, only gear steps of less than 15% can be handled well by a person.

The so-called secondary transmission is formed by two further belt wheels, which transfer the torque from the transmission to the rear wheel. It is advantageous if these belt wheels do not impair the function of the pedal bearings and the rear wheel hub by their proportions. The design according to US 2004/0067804 A1 and US 2004/0066017 A1 would make a very large and voluminous structure, if the framework conditions with respect to secondary transmission, overall transmission and gear transition were to be achieved.

Belt and chain drives in general have a discrete axial distance, which depends exclusively on the pitch and the length of the belt, and the diameter or the number of teeth of the belt wheels used. This axial distance can be described by the following formula:

$$a = p/4 \left[ X - (z_1 + z_2)/2 + \sqrt{[X - (z_1 + z_2)/2]^2 - 8[(z_2 - z_1)/(2\pi)]^2} \right]$$

a=axial distance
p=chain pitch of the chain
X=number of links of the chain
$z_1$=number of teeth of the small sprocket wheel
$z_2$=Number of teeth of the large sprocket wheel If this formula is applied to US 2004/0067804 A1 and US 2004/0066017 A1, it is found that not every individual belt wheel has the correct axial distance. A structure according to US 2004/0067804 A1 and US 2004/0066017 A1 is thus disadvantageous, since some chains are taut and others are loose. This must be considered a major disadvantage, since incorrectly tightened chains have excessive wear. This disadvantage is referred to below as "only discrete axial distances possible." Only discrete axial distances are possible with U.S. Pat. No. 4,158,316 due to the belt used. This must also be seen as a disadvantage. At the same time, it should be noted that this disadvantage of the discrete axial distances also occurs with gear trains.

Another major disadvantage is to be found inside the shifting control with U.S. Pat. No. 4,158,316, US 2004/0067804 A1 and US 2004/0066017 A1. If a gear change is to be performed, first a belt wheel is disengaged from the driven shaft and only thereafter is another belt wheel engaged to the shaft. As a result, with these drives a permanent rotationally fixed connection between the shaft and a gear wheel is not guaranteed. During a change of gear, a neutral position can occur. To the cyclist this means suddenly pedaling "into a void." This can cause injuries, particularly in the knee area.

In the past, belt and chain drives were often found with belts running parallel, in which the belt wheels are engaged to one axle (see also CH 167867, U.S. Pat. No. 6,146,296 and U.S. Pat. No. 5,871,412). However, all of these constructions exhibit the disadvantage that a small time window with a neutral position could always develop between two engaged gear ratios. In particular under load it cannot be ensured that a brief clutch slip cannot occur during this time window. Likewise a clutch slip of this type leads to enormous wear on the clutches. Over the long term damage cannot be excluded under certain circumstances.

To sum up, many transmissions according to the above systems have problems with respect to weight, production costs, ability to shift under load, neutral position and ability to switch at stop.

SUMMARY OF THE INVENTION

Based on the above noted problems, the present invention provides improvements to the multiple gear transmission. For example, the invention is designed such that no neutral position can occur between individual gears during gear changing. This is seen as a major advantage. Also, advantageously a torque-transmitting component is always engaged between two gears during gear changing. Additionally, the construction of the transmission increases the efficiency of the drive, at least compared to DE 103 39 207. The construction of the present invention also includes gear ratios that should increase speed in the range of 0.7-4.0. In contrast to US 2004/0067804 A1 and US 2004/0066017, the invention is a very much smaller structure.

The invention can be used in every conceivable product sector and particularly with respect to the low weight is extremely well suited to use in vehicles, since fiber-reinforced plastics are used as power transmitting components. The invention provides a light and easy to build solution for the transmission type described. Accordingly, the invention improves a multiple gear transmission with an input shaft and an output shaft. The input shaft can be embodied to carry the input torque and the output shaft can be generally guided out of the transmission housing and embodied at this end to pass on the torque to the wheels of the vehicle. In the housing, for example, drive wheels are arranged in a parallel manner on the input shaft and on the output shaft and connected in pairs with drive mechanism. With the aid of a shifting control, the traction mechanism wheels can be coupled to the output shaft. The vehicle can be, e.g., a bicycle, the input shaft there being embodied to absorb pedal bearings and both ends protruding from the transmission housing. The output shaft has on its end a sprocket for torque transmission to the rear wheel. Likewise, the vehicle can be a motorcycle, in which the transmission is advantageously located behind the crankcase. The input shaft is connected to the crankshaft in a suitable manner. The output shaft transmits the torque through another machine element (e.g., chain, toothed belt, cardan) to the rear wheel. Use in a motor vehicle in an advantageous manner is also conceivable.

In embodiments, the invention includes transmission gear ratios with transmission wheels, which can be embodied as gear trains or as belt and chain drives, located between the input shaft and the output shaft. The invention also comprises transmission wheels supported in a rotatable manner on the input shaft or on the output shaft, which transmission wheels can be connected to the shaft in a torsionally fixed manner by a positive clutch mechanism. The transmission wheels are constantly in rotation during operation. At least one component is supported in a rotatable or displaceable manner relative to a toothing within the clutch mechanism. At least one component can adopt a positive position in a toothing within the clutch mechanism. At least one component can adopt a position at a distance relative to a toothing within the clutch mechanism.

Also, it is contemplated that to solve the above noted problems a multiple gear transmission can include:
    At least one component within the clutch mechanism has the properties of a permanent magnet with a magnetic north and south pole,
    The state of the clutch mechanism changes through the change of an additional magnetic field inside or in the direct vicinity of the clutch mechanism,
    During at least one shifting operation the state of at least two clutch mechanisms changes simultaneously, and
    At least one clutch mechanism can transfer only torque in one direction of rotation.

In view of the above features it is impossible for the transmission to be accidentally shifted to a neutral position through a shifting error, which can cause damage to the transmission and under some circumstances to injuries to a rider. Since only magnetic fields are changed to change gears, shifting gear under load and at stop are also possible.

By at least one component adopting a position at a distance relative to a toothing of a clutch mechanism, after two identically polarized magnetic fields have moved towards one another, it can be ensured that the shifting forces are reduced compared to the known art. Also, since the positive clutch mechanism is formed by freewheel teeth that can engage in a toothing, the entire construction can be kept very simple. A very space-saving design results by the toothing embodied within the clutch mechanism as an internal toothing.

Preferably, the freewheel teeth are arranged symmetrically to the toothing inside the clutch mechanism in order to transmit the forces evenly. By the freewheel teeth tiltably supported on steel axles inside the shaft on which the clutch mechanism is located, the torque is transmitted in an advantageous manner. Low production costs are also achieved, i.e., by at least one clutch mechanism being assembled from a permanent magnet and a steel component. The same advantage results by the permanent magnets being axially displaced incorporated for this purpose into a control slide valve component.

An advantageous control of the transmission is realized by the change of the magnetic field achieved through axial displacement of permanent magnets along the rotational axis of the shaft on which the clutch mechanism is located. Superfluous weight is avoided by the axial displacement of permanent magnets being performed inside a hollow driven shaft. Transmissions without designed space-determined access to the interior of the shafts can also be structured according to the invention, by the axial displacement of the permanent magnets being performed outside the input shaft. Low production costs are achieved, i.e., by the permanent magnets that are axially displaced being incorporated into a control slide valve component for this purpose. Preferably the permanent magnets are incorporated into the control slide valve component with different polarization, so that the production costs can be kept low by the use of many identical parts.

An advantageously simple shifting control results by a bearing located inside the control slide valve component in order to transmit the shifting signal from a rotating to a stationary component. A very cost-effective solution for the axial movement of the control slide valve component is achieved by the control slide valve component being connected to a belt. Preferably the control slide valve component takes up detent points within its axial movement with respect to the shaft, in order to change the magnetic field inside or in the direct vicinity of the clutch mechanism in a reproducibly identical manner. Shifting precision is improved hereby.

Freedom from disturbances in the case of vibrations from outside is achieved by a tilted position of the freewheel tooth on the steel axle held by a permanent magnet. The installation of this permanent magnet is particularly simple by the permanent magnet being inserted into the shaft on which the clutch mechanism is located. The necessary shifting forces are kept low if the positive rotationally fixed connection between shaft and transmission wheel can be cancelled with the aid of the energy that is stored before disengagement in the magnetic field.

A fully electronic control of the state of the clutch mechanism can be achieved by the change of an additional magnetic field being performed inside or in the direct vicinity of the clutch mechanism by electromagnets. This can be advantageous in many areas of application of the transmission.

The transmission is protected from outside soiling by the frame of the transmission being embodied as a closed housing. Also, dead weight is greatly reduced by the transmission gear ratios located between the input shaft and the output shaft embodied as a belt and chain drive with toothed belts as belts and with toothed belt pulleys as transmission wheels.

Particularly high power and torque can be transmitted by the belts being reinforced by aramid, Kevlar or carbon-fiber materials. A particularly low wear on the belt is obtained if the fiber materials of the toothed belts are encased in polyurethane. Low friction is obtained if during no-load rotation on the toothed belt wheels the belt is pressed by at least one component into a kidney-like form and under load impact this component does not touch the belt. In addition, it is optimal if the kidney-like form of the belt during no-load rotation is formed by a convex curvature of the driving side and by a concave curvature of the slack side.

The skipping of the toothed belt on the toothed belt pulleys can be advantageously achieved by the kidney-like form of the belt under load being formed by a straight form of the driving side and by an intensified concave curvature of the slack side. In addition, the belts changing their belt tension during the shifting operation can reduce the friction of the toothed belts. More security against the toothed belt skipping on the toothed belt pulleys is achieved if the belts change their chain wraparound on the toothed belt wheel during the shifting operation The friction can be additionally reduced by at least one component that presses the belt into a kidney-shaped form, is embodied as a roll.

Also, if additional guides are arranged on the slack side without contact in the direct vicinity of the toothed belts, which are shaped in a similar manner to the outer contour of the toothed belt, more security against the toothed belt skipping on the toothed belt pulleys during load impacts and external disturbances is achieved without additionally increasing the friction.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 4a shows a belt and chain drive in exploded view;

FIG. 4b shows a belt and chain drive in perspective representation;

FIG. 6a shows a structure of the driven shaft assembly in exploded view;

FIG. 6b shows a structure of the driven shaft assembly in perspective view;

FIG. 7a shows a structure of the belt and chain pulleys on drive shaft and driven shaft in exploded view;

FIG. 7b shows a structure of the belt and chain pulleys on drive shaft and driven shaft in perspective representation;

FIG. 8a shows a belt assembly in exploded view;

FIG. 8b shows a belt assembly in perspective representation;

FIG. 9a shows a shifting in exploded view;

FIG. 9b shows a shifting in perspective view;

FIG. 10a shows a shifting operation inside the driven shaft—$1^{st}$ position;

FIG. 10b shows a shifting operation inside the driven shaft—$2^{nd}$ position;

FIG. 10c shows a shifting operation inside the driven shaft—$3^{rd}$ position;

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice. The embodiment described below uses a belt and chain drive as transmission steps by way of example. However, the mechanisms described can also be applied to gear trains.

Figure 1:
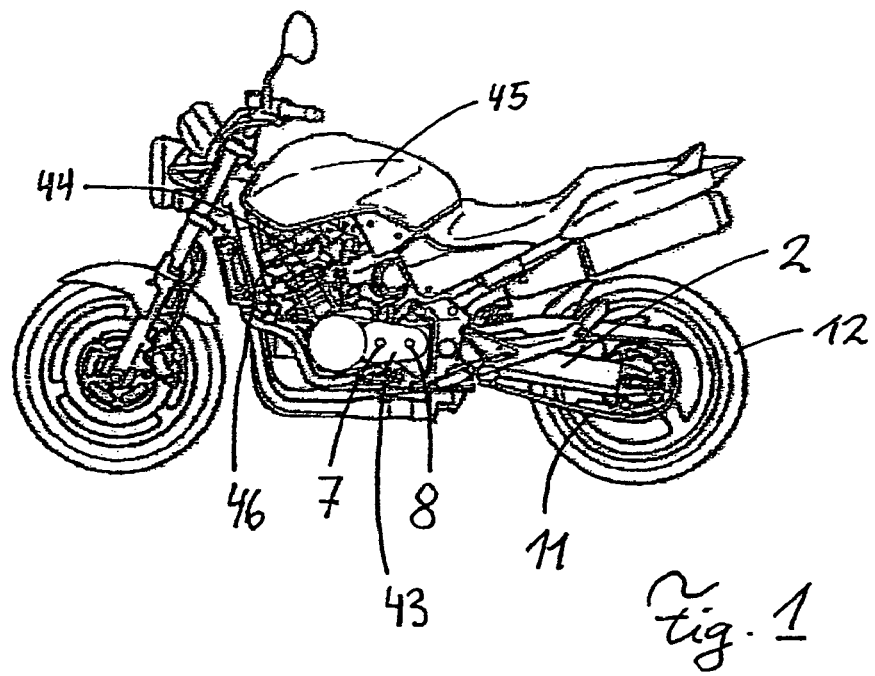
FIG. 1 shows a motor cycle in side view and with the belt and chain drive integrated into the frame.

FIG. 1 shows a side view of a motorcycle with the new type of transmission in accordance with the invention. A internal combustion engine 44 is discernible installed in the classic position under a tank 45 and enclosed by a tubular frame 46. The wing 2 is supported on the tubular frame 46. The rear wheel 12 is located at the end of the wing 2. All the customary parts of a motorcycle are shown in the figure, but will not be considered in further detail. The new type of transmission (transmission in accordance with the invention) inside the transmission housing 43 is located behind the crankshaft in the direction of travel. The input shaft 7 is connected to the crankshaft lying parallel by a primary drive (not shown). The output shaft 8 has a driven sprocket 4 (not shown), which transmits the torque via the chain 11 to the rear wheel 12.

Figure 2:
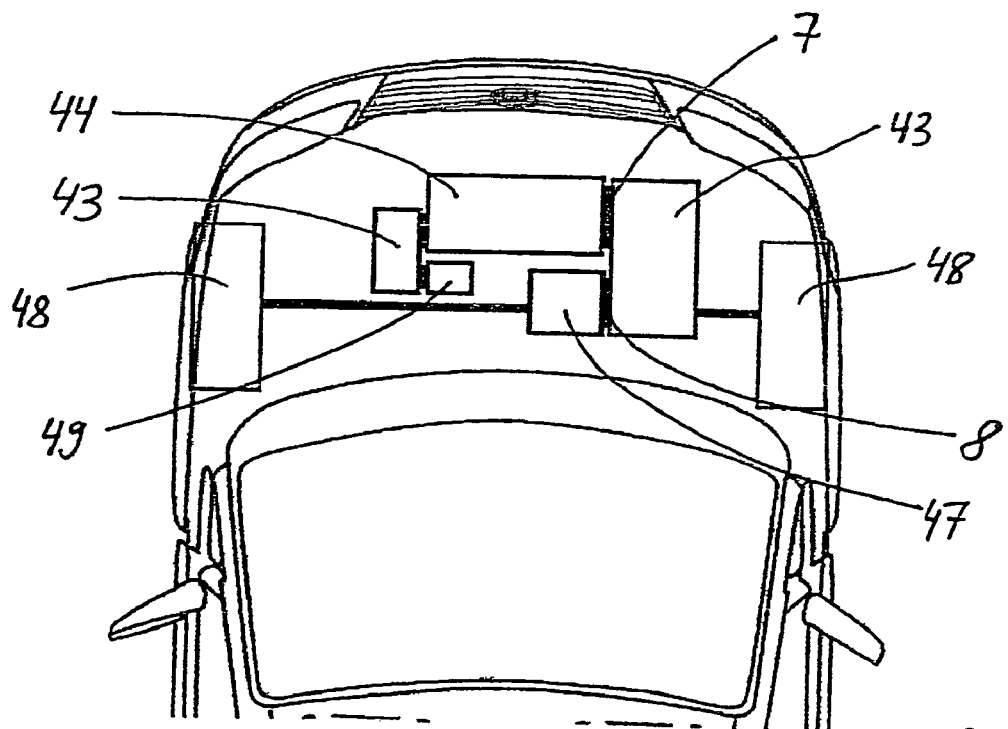
FIG. 2 shows a motor vehicle in side view and with the belt and chain drive integrated into the frame.

FIG. 2 shows the implementation of the invention inside a motor vehicle. The drive components are shown in diagrammatic form. In this view there is a classic engine 44 installed transversely to the direction of travel. The new type of transmission inside the transmission housing 43 is directly connected to the crankshaft with the input shaft 7. The output shaft 8 transmits the torque to a differential 47. Both front wheels 48 are driven from the differential 47. Ancillary components 49, such as generator, hydraulic pump for power steering, cooling fans and the like can also be operated via the new type of belt and chain drive. All of these applications have been difficult to realize as a manual belt and chain drive in the past, since suitable belts were not available. Through the introduction of new types of belts, in particular the introduction of new types of toothed belts, it is now possible to produce transmissions with a power-to-weight ratio which are as good as and even superior to the classic spur gear transmission or planetary transmission made of steel. A detailed technical embodiment is shown below based on a bicycle.

Figure 3:
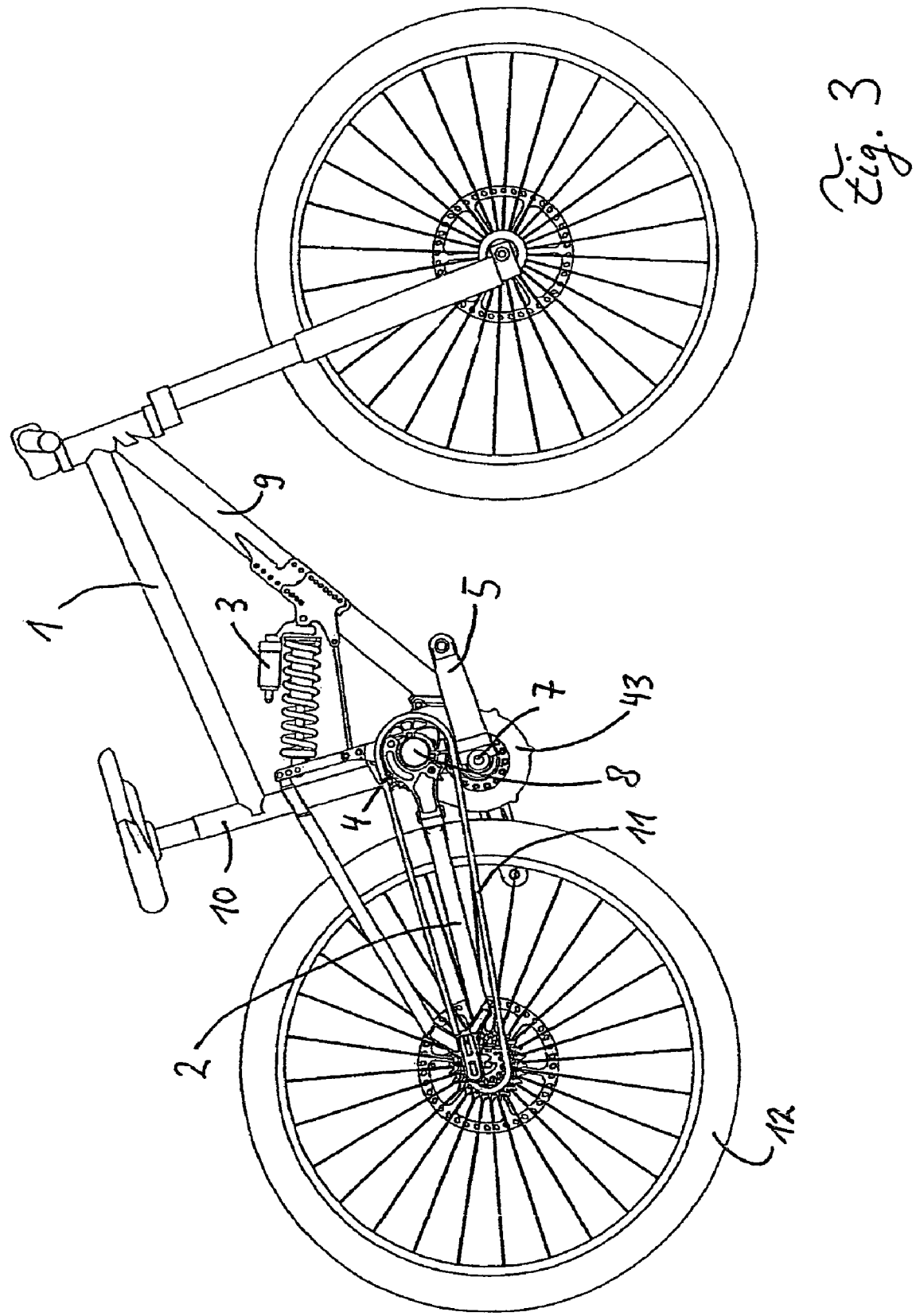
FIG. 3 shows a bicycle in side view and with the belt and chain drive integrated into the frame.

FIG. 3 shows a side view of a bicycle, in the frame 1 of which the new type of belt and chain drive is arranged inside the transmission housing 43 with pedal bearings 5. The rear wheel wing 2 is attached to a hinged joint and a damper element 3 is attached to the frame or to the transmission housing. The input shaft 7 and the output shaft 8 protrude out of the transmission housing part 43. The input shaft 7 is connected to the pedal bearings 5. A driven sprocket 4 is attached outside the housing part 43 on the output shaft 8, with which driven sprocket the rear wheel 12 is driven via the chain 11. The housing part 43 is mounted here by way of example between the seat tube 10 and the lower tube 9. The rear wheel 12 is supported in the dropout of the wing 2 in the usual manner.

An exemplary embodiment of the new type of belt and chain drive is described in more detail below with the aid of FIGS. 4a through 12b. The new type of belt and chain drive 18 is accommodated in a multipart housing 43, which as shown by FIGS. 4a and 4b, comprises a right and a left housing cover 13 and 14 and a housing center section 15. Pivot bush receptacles 20 and 19 are arranged in the housing covers 13 and 14, which receptacles represent the connection to the rear wheel wing 2 (not visible). The driven sprocket assembly 6 is hinge-mounted thereon. The two shifting controls 16 and 17 are located outside the driven sprocket assembly 6. The bottom bracket eccentrics 21 and 22 are supported in the housing sections 13 and 14 and coaxial with the input shaft 7. The pedal bearings 5 are located to the left and right of the bottom bracket eccentrics 21 and 22, which pedal bearings 5 are attached to the belt and chain drive 18 with a hexagonal receptacle in a rotationally fixed manner and can thus transmit the torque.

Figure 5A:
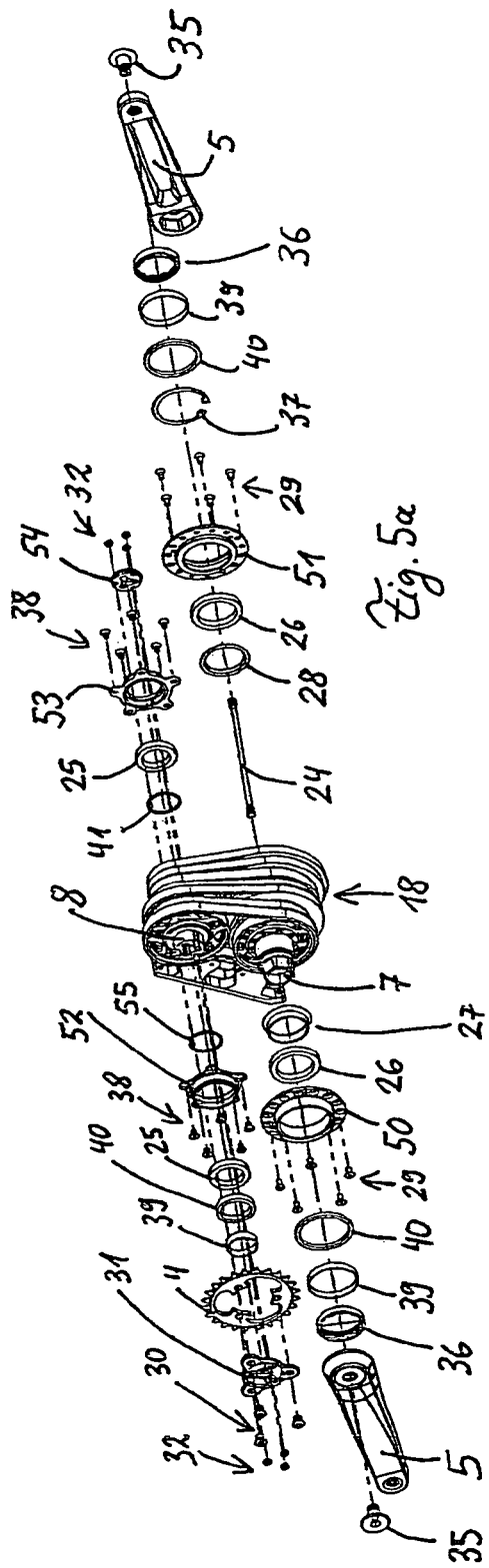
FIG. 5a shows a belt and chain drive without shifting control, housing, belt and belt and chain pulleys.
Figure 5B:
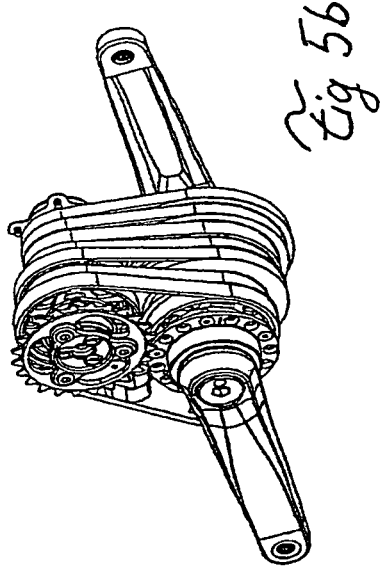
FIG. 5b shows a belt and chain drive without shifting control, housing, belt and belt and chain pulleys in exploded view.

FIGS. 5a and 5b show the housing bearing of the new type of belt and chain drive in detail. Ball bearings 26 are located arranged on the input shaft 7 (not shown), these ball bearings 26 in turn being arranged in the bottom bracket eccentric shell 50 and 51. Clamping rings 27 and 28 are located inside the eccentric housing 50 and 51, which clamping rings serve as spacers for the ball bearings 26. Furthermore, a snap ring 37, which secures the ball bearings 26 from slipping sideways, is located on the left side. Seals 40 and sealing bearer rings 39 are mounted on both sides on the bottom bracket nuts 36, which protect the belt and chain drive 18 from environmental effects. The eccentric housing 50, 51 is attached to the housing covers 13 and 14 (not visible) with 5 screws 29. Through the hinged mounting of the bottom bracket eccentrics 21 and 22, the axial distance from the input shaft 7 to the output shaft 8 can be varied. The driving cranks 5 are attached to the shaft on both sides by a hexagonal receptacle and moreover fixed by long nuts 35 and a drawbar 24 located in the shaft.

The drive shaft 8 is located inside the new type of belt and chain drive 18 and is supported on both sides by annular ball bearings 25 and a bearing thrust plate 55 inside the pivot bush receptacle housings 52 and 53. Five screws 38 attach the two pivot bush receptacles 19 and 20 on the housing covers 13 and 14 (not shown). A protection against external environmental effects such as dirt and water is achieved through a seal 40 and a sealing bearer ring 39, which are likewise located in the pivot bush receptacle housings 52 and 53. Three multitooth axles 23, only partially visible in FIG. 5a, which transmit the torque via the sprocket flange 31 to the driven sprocket 4, are located inside the driven shaft 8. The connection from driven sprocket 4 to sprocket flange 31 is made via three screws 30. In order that the driven shaft 8 is axially fixed in the housing 43, an end cap 54 attaches on the left side the annular ball bearing 25 and the bearing thrust plate 41 to the pivot bush receptacle housing 52 and 53 with the aid of three nuts 32, which are screwed onto the multitooth axles 23 already mentioned.

FIG. 6a and FIG. 6b show the structure of the belt pulleys 60 and 61 on the drive (input) shaft 7 and driven (output) shaft 8. The drive shaft 7 is connected to the drive belt pulleys 60 in a torsionally resistant manner by the spline profile and thus secured against radial displacement. The shoulder rings 59 serve as spacers and secure the axial position of the drive belt pulleys 60 with respect to the belts 56 during operation. The driven belt pulleys 61 are supported on the output shaft 8 in a congruent manner to the drive belt pulleys 60. The belt assemblies 56 enclose the respectively associated belt pulleys 60 and 61.

The belt pulleys 60 and 61 are selected in size and arrangement such that a uniform graduation of the individual gears is possible. The drive belt pulleys 60 are respectively located on the drive shaft 7 with the following order and teeth number 34, 31, 41, 38, 40, 45 and 49. The driven belt pulleys 61 are attached with the following order and teeth number: 34, 27, 31, 25, 23, 23 and 22. These teeth numbers are selected only by way of example to explain the construction and can likewise be selected differently. Depending on which driven belt pulley is engaged with the driven shaft by a mechanism yet to be described, a different gear ratio is obtained between the drive shaft and the driven shaft. In an advantageous embodiment, the belts are embodied as fiber-reinforced toothed belts.

The structure of the driven shaft assembly 65 is shown in FIG. 7a and FIG. 7b. Freewheel teeth 58 are supported respectively between the driven belt pulleys 61 on the three multitooth axles 23. The movement of the freewheel teeth 58 on the multitooth axle 23 is controlled by the shifting part 87 (not visible in this figure). Axial wedges 96 are introduced into the driven shaft 8 in order to axially secure the inner races of the annular ball bearing 62 and to keep them spaced apart at specific positions on the shaft. Between the inner races of the ball bearings, the driven shaft 8 has recesses in which the freewheel teeth 58 can perform tilting movements. A positive connection between the freewheel teeth and an internal toothing of freewheel bodies 63 can be produced by this tilting movement. These freewheel bodies 63 are connected with the outer races of the ball bearing 62 and in this manner hinge-mounted on the shaft. However, the freewheel bodies 63 themselves are rotationally fixed and connected to the driven belt pulleys 61. In this manner the torque is transferred from the drive shaft 7 to the driven shaft 8 in a selectable manner via the different belts 66.

FIG. 8a and FIG. 8b provide a detailed view of the belt assembly 56. The belt guide 68, for example with the aid of pressure bearings 69 presses the belt 66 in the direction of the belt pulleys 60 and 61. Valve shims 69 secure the spacing to the attachment 68 and screws 67 fix the pressure bearings 69 to the belt guide 68, with the use of valve shims 84. In an advantageous embodiment the belts are embodied in their structure such that only one pressure bearing is necessary to press the belt into the kidney-shaped contour.

The structure of the shifting control 16, 17 is explained in more detail in FIG. 9a and FIG. 9b. Two cable housings 86, which are screwed on the outside to the transmission housing 43 and are closed by the cable cover 80, are connected by a cable 76. The shifting part 87 is axially connected in the center to the cable 76 and, in order to ensure the rotatability of the shifting part, supported with two radial ball bearings 89. The cable 76 is guided over the deflection pulleys 90 supported on pins 78 inside the driven shaft 8 on both sides to the traction coils 72. The traction coils 72 are located supported inside the two cable housings 86. Two further cables 77 and 76 are likewise inserted into the cable housing 86 and are used to control the shifting from the handlebar. Both cables 76 and 77 run in two parallel grooves on the circumference of the traction coil 72 and are attached by a clamping screw 88 or by a cylindrical end body. The cables are coiled and uncoiled through the rotation of the traction coils in this manner and an axial movement of the shifting part 87 occurs hereby inside the driven shaft 8.

Detent recesses for detent lever 73 are located on the circumferential surface of the traction coils 72 so that the shifting part 87 can adopt only specific and reproducible positions inside the driven shaft 8. The torsion spring 74 presses the radial ball bearing 75 on the detent lever 73 against the waveform surface of the traction coil 72. Through the troughs on the traction coil 72, this can adopt a rest position only at specific angular positions. The torsion spring 74 is located on a plain bearing 83 on a pin 81. A valve shim 84 secures the spacing of the radial ball bearing 75 from the cable cover 80, which is attached to the cable housing 86 with screws 82. It should be noted by way of explanation that the radial ball bearing 70 renders possible the rotary motion of the coil inside the traction coil 72 and a snap ring 71 secures these bearings against displacement. Since the cable 76 is also guided through the driven sprocket assembly 6 (not shown), a special hollow screw 34 is necessary, which is located inside the sealing ring 85 and is attached via a nut 33. Through this overall structure the user can thus move the shifting part 87 axially with the aid of the cables 77 inside the driven shaft 8 (not shown) to seven reproducible positions. Considering the fact that in addition on the shifting part 87 respectively five magnets 79 are additionally located on three sides, the user can adjust seven reproducible magnetic fields inside the driven shaft 8. The shifting part 87 including the magnets 79 located thereon is also referred to below as control slide valve 100. Section plane A is shown within FIG. 9b.

FIG. 10a shows a section through the driven shaft in this plane A between two belt pulleys 61. One freewheel body 63 with internal toothing is installed for each toothed belt pulley 61. Three freewheel teeth 58 are discernible arranged symmetrically inside the freewheel body 63 and tiltably supported on the multitooth axles 23. The freewheel teeth 58 are shown in this FIG. 10a in a non-engaged state. The contact surface B of the freewheel tooth 58 is located "disengaged" at a certain distance from the internal toothing of the freewheel body 63. On the faces between driven shaft 8 and freewheel tooth 58 the driven shaft 8 in section bears small holding magnets 92, which ensure that the freewheel teeth always remain in a disengaged state even with external disturbances (vibrations, etc.). The prerequisite hereby is of course that the freewheel tooth 51 is made from a magnetic material. The shifting part 87 is discernible in the center of the figure and shown without cable 76. The rectangular magnets 79 are likewise located symmetrically to the center inside the shifting part 87. In this configuration, their magnetic field pushes the three freewheel tooth magnets 91 outwards. Since the freewheel tooth magnets 91 are embedded in the freewheel teeth 58 in a fixed manner, the tilting movement of the three freewheel teeth 58 is controlled in this manner. The multitooth axles are preferably made of steel and transmit the torque directly up to the driven sprocket assembly 6. Excessive material stresses are hereby kept away from the driven shaft. The negative polarity on both sides of the freewheel tooth magnets 91 and the magnets 79 is shown by a minus sign within FIG. 10a. This state from FIG. 10a can thus be described as "magnetically disengaged."

FIG. 10b likewise shows a section through the driven shaft in the plane A between two belt pulleys 61. The three freewheel teeth 58 can also be seen here symmetrically arranged inside the freewheel body 63 and supported on the multitooth axles 23 in a tiltable manner. However, in FIG. 10b, the freewheel teeth 58 are shown in an engaged state. The contact surface B of the freewheel tooth 58 is "engaged" in positive connection with the internal toothing of the freewheel body 63. The holding magnets 92 arranged inside the driven shaft 8 do not touch the freewheel teeth in this position. The shifting part 87 is discernible in the center of the figure and shown without cable 76. The rectangular magnets 79 are likewise located symmetrically to the center within the shifting part 87. In this configuration their magnetic field draws the three freewheel tooth magnets 91 inwards. Since the freewheel tooth magnets 91 are embedded in the freewheel teeth 58 in a fixed manner, the tilting movement of the three freewheel teeth 58 is controlled in this manner. The internal toothing of the freewheel body 63 is designed such that the freewheel teeth can transmit only one torque if the belt pulley 61 rotates clockwise. With counterclockwise rotation the structure operates as a freewheel. The fact that the magnets attract one another is shown by a plus and a minus sign in FIG. 10b. This state from FIG. 10b can therefore be described as "magnetically engaged."

FIG. 10c likewise represents a section through the driven shaft 8 in the plane A between two belt pulleys 61. The three freewheel teeth 58 are also discernible here symmetrically arranged inside the freewheel body 63 and tiltably supported on the multitooth axles 23. However, in FIG. 10c, the freewheel teeth 58 are shown in a disengaged state, just as in 10a. The contact surface B of the freewheel tooth 58 is located "disengaged" at a spacing from the internal toothing of the freewheel body 63. The holding magnets 92 arranged inside the driven shaft 8 touch the freewheel teeth 58, made of steel and therefore magnetic, and hold them firmly in position. The shifting part is not located under the freewheel teeth 58 here, but axially displaced inside another belt pulley. This state from FIG. 10c can therefore be described as "freely disengaged." It should be noted by way of explanation that these clutch mechanisms can be arranged in principle on any shaft of a transmission. The clutch mechanism is shown here on the output shaft by way of example.

Figure 11A:
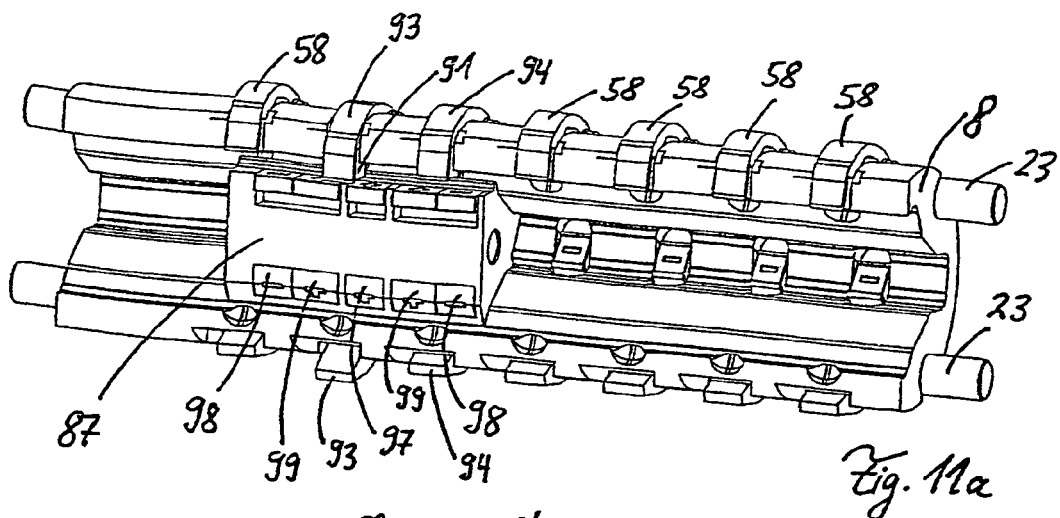
FIG. 11a shows a position of the freewheel teeth—disengaged.
Figure 11B:
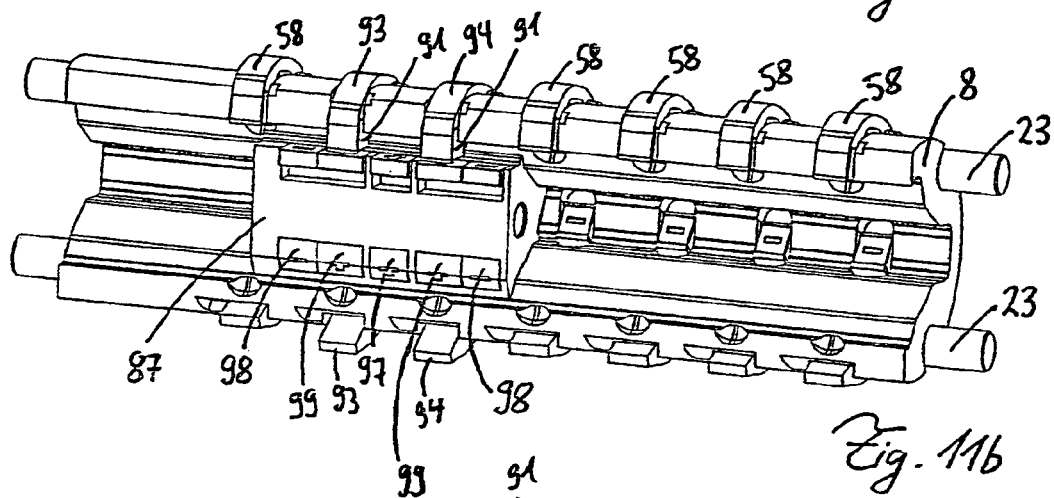
FIG. 11b shows a position of the freewheel teeth—engaged.
Figure 11C:
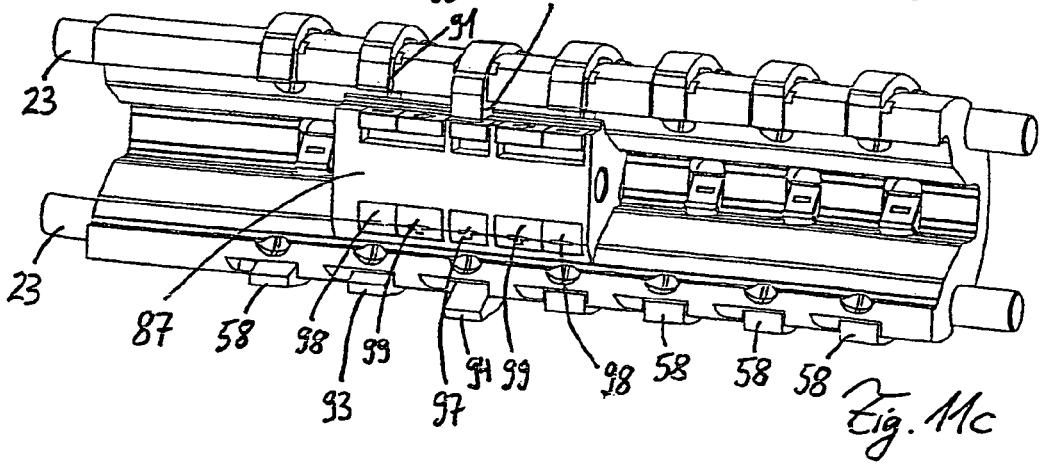
FIG. 11c shows a position of the freewheel teeth—starting position.

The shifting operation in detail is shown by way of example in FIGS. 11a, 11b and 11c. FIG. 11a shows the driven shaft 8 with the clutch mechanism in lengthwise section without the freewheel body 63 and without the belt pulleys 61. The shifting control already described in FIG. 9a is restricted to the representation of the shifting part 87, in that the magnets 79 are inserted. The polarity of the magnets is shown by a plus and a minus sign. Two of three multitooth axles 23 are likewise discernible, which are often referred to below as steel axles. The freewheel teeth 58 can perform tilting movements on these multitooth axles 23. In general inside here at least one component is hinge-mounted or displaceably supported relative to a toothing.

Aligned with its positive side to the freewheel tooth, the center magnet 97 is located inserted into the shifting part 87 in a fixed manner. The shifting part 87 is located in the representation precisely in the center under the engaged freewheel tooth 93. The freewheel tooth magnet 91 is aligned with its negative pole to the shifting part 97 and is thus attracted. Through the rocker shape of the freewheel teeth, the contact surface B from the representation in FIG. 10a is pressed hereby into the internal toothing of the freewheel body (not shown). In this manner a rotationally fixed connection is produced between the input shaft and the output shaft through this positive clutch mechanism. Or to put it generally, at least one component inside the clutch mechanism can adopt a positive position in a toothing. Magnets 98 are likewise inserted at both outer edges of the shifting part 87, which magnets however are aligned with their negative side in the direction of the freewheel teeth 93. Through this alignment the freewheel tooth magnet 91 is pushed from the shifting part 97 with its negative pole and in this manner actively disengaged. The so-called overlapping magnets 99 are located directly next to the negatively polarized magnets 98, which overlapping magnets are inserted into the shifting part 87 in a fixed manner with their positive side aligned to the freewheel tooth.

In FIG. 11a the overlapping magnets 99 do not have any influence on the freewheel teeth 58, 93 and 94. In FIG. 11a, the second gear from the left is engaged. In addition, it should be noted that in FIG. 11a the shifting part is located at a detent point and therefore the second gear is in an engaged state.

FIG. 11b shows the shifting operation from gear two into gear three. If the third freewheel tooth 94 from the left side is observed, the engagement operation from gear three is the same as the tilting movement of this freewheel tooth 94. The shifting part 87 is likewise discerned in FIG. 11b during its movement to the right. As soon as the shifting part 87 has already covered a certain distance, the overlapping magnets 99 already effect the engagement operation of the freewheel tooth 94. In this situation, however, the freewheel tooth 93 is still engaged. Since both freewheel teeth cannot transmit forces due to the different gear ratios within the individual gear steps, at this moment one of the two freewheel teeth 93 and 94 is operating in its freewheel function and skips to the internal toothing in a manner that is imperceptible to the user. At this point, however, it is important to emphasize that the transmission for this reason is not able to adopt a neutral position. In addition, it should be noted that the shifting part is not located at a detent point in this FIG. 11b and is forced by the mechanism described in FIG. 9 to adopt the position shown in FIG. 11c.

FIG. 11c shows the completed shifting operation from gear two to gear three. Observation of the second freewheel tooth 93 from the left shows that it has been pressed out of the positive connection of the freewheel body by the negatively polarized magnet on the shifting part. In general, at least one component can a position at a distance relative to a toothing inside the clutch. The shifting part 87 can likewise be discerned in FIG. 11c precisely in the center again in its detent position under the third freewheel tooth 94. The shifting process has thus been completed. It is hereby shown with this 7-gear multiple-gear transmission by way of example that the ability to shift under load and to shift at stop can be achieved through the invention. It is likewise clear that the accidental engagement of a neutral position is likewise impossible. FIG. 11 thus shows by way of example that the invention is advantageously additionally characterized in that at least one component adopts a position at a distance relative to a toothing after two identically polarized magnetic fields have moved towards one another.

Figure 12A:
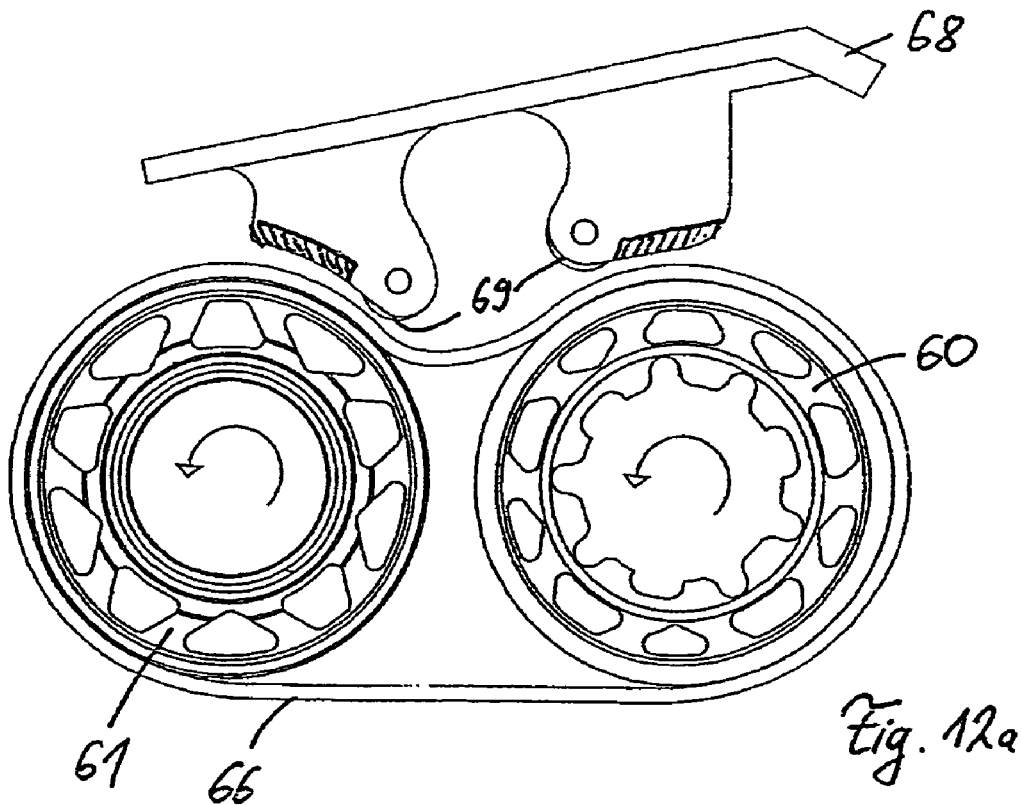
FIG. 12a shows the transmission ratio in a loaded state.

FIG. 12a shows a transmission ratio with a belt 66 and a belt pulley 60 for the drive and a belt pulley 61 for the output. The belt 66 is advantageously embodied as a toothed belt and the belt pulleys 60 and 61 as toothed belt pulleys. However, this fact is not shown in the figure.

Figure 12B:
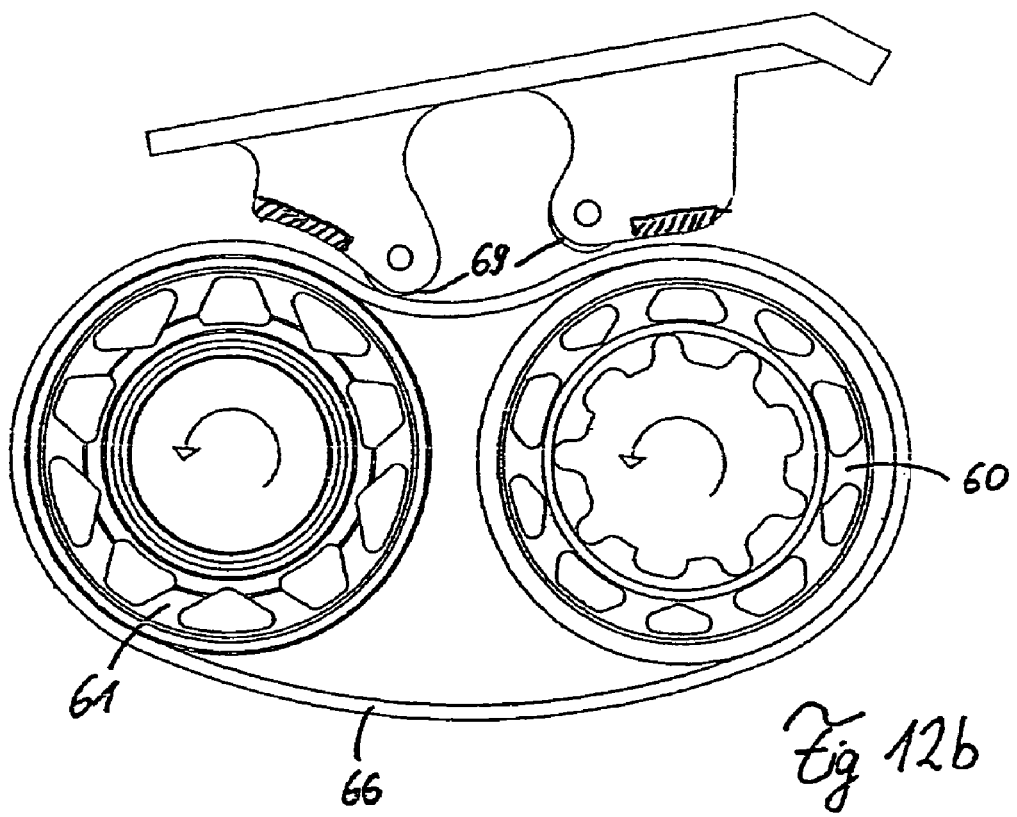
FIG. 12b shows the toothed belt without load

FIG. 12a shows the transmission ratio in the loaded state. It is discernible that the pressure bearings 69 do not touch the belt in this load position. This prevents the toothed belt skipping on the toothed belt pulleys, since an increase in the load leads to an increase in the chain wraparound and also to a more markedly concave curvature of the slack side. However, without load the toothed belt, as shown in FIG. 12b, tries to form a convex shape through its internal stress in the driving side and in the slack side. However, this is prevented on the slack side by the pressure bearing. In general, the belt is thus pressed into a kidney-like shape by at least one component during no-load rotation. On the driving side the belt can be clearly seen to achieve its convex form in FIG. 12b.

Skipping by the toothed belt to the toothed belt pulleys is thus prevented in an advantageous manner, in that the kidney-like shape of the belts is formed under load by a straight shape of the driving side and by a more markedly concave curvature of the slack side. If load impacts and external disturbances act on the transmission, this can lead to a lifting of the toothed belt from the toothed belt wheels. In FIGS. 12a and 12b areas are shaded which form additional guides on the slack side without contact in the direct vicinity of the toothed belts and are shaped in a similar manner to the outer contour of the toothed belt. These guides prevent the toothed belts from leaving the toothed belt pulleys completely and thus prevent damage to the belt by squashing action between pressure roll and toothed belt pulley.

The foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A multiple gear transmission with magnetic control for vehicles or for use in drive technology comprising:
   an input shaft supported on a frame and an output shaft, the input shaft protruding from the frame at least one end and the output shaft protruding from the frame at one end;
   transmission gear ratios with transmission wheels, embodied as gear trains or belt and chain drives, located between the input shaft and the output shaft;
   the transmission wheels supported in a rotatable manner on the input shaft or on the output shaft, the transmission wheels being connected to the input shaft or the output shaft in a torsionally fixed manner by a clutch mechanism, the transmission wheels are constantly in rotation during operation;
   at least one component supported in a rotatable or displaceable manner relative to a toothing within the clutch mechanism;
   at least one component adopting a positive position in the toothing within the clutch mechanism;
   at least one component adopting a position at a distance relative to the toothing within the clutch mechanism;
   at least one component within the clutch mechanism having properties of a permanent magnet with a magnetic north and south pole within a magnetic field, wherein
   a state of the clutch mechanism changes through the change of an additional magnetic field inside or in a direct vicinity of the clutch mechanism,
   during at least one shifting operation the state of at least two clutch mechanisms changes simultaneously, and
   at least one of the clutch mechanisms transfers only torque in one direction of rotation.

2. The multiple gear transmission according to claim 1, wherein the at least one component adopts the position at a distance relative to the toothing after two identically polarized magnetic fields have moved towards one another.

3. The multiple gear transmission according to claim 1, wherein a positive clutch mechanism is formed by freewheel teeth, which engage in the toothing.

4. The multiple gear transmission according to claim 3, wherein the toothing is embodied as an internal toothing.

5. The multiple gear transmission according to claim 3, wherein the freewheel teeth are arranged symmetrically to the toothing.

6. The multiple gear transmission according to claim 3, wherein the freewheel teeth are tiltably supported on axles inside one of the input shaft and the output on which the clutch mechanisms are located.

7. The multiple gear transmission according to claim 1, wherein the at least one clutch mechanism is assembled from the permanent magnet and a steel component.

8. The multiple gear transmission according to claim 1, wherein the change of the magnetic field is achieved through axial displacement of permanent magnets along a rotational axis of one of the input shaft and the output on which the clutch mechanism is located.

9. The multiple gear transmission according to claim 8, wherein the axial displacement of the permanent magnets is performed inside a hollow driven shaft.

10. The multiple gear transmission according to claim 8, wherein the axial displacement of the permanent magnets is performed outside the input shaft.

11. The multiple gear transmission according to claim 8, wherein the permanent magnets that are axially displaced are incorporated into a control slide valve component.

12. The multiple gear transmission according to claim 11, wherein the permanent magnets are incorporated into the control slide valve component with different polarization.

13. The multiple gear transmission according to claim 11, further comprising a bearing located inside the control slide valve component.

14. The multiple gear transmission according to claim 11, wherein the control slide valve component is connected to a belt for the axial movement.

15. The multiple gear transmission according to claim 11, wherein the control slide valve component takes up detent points within its axial movement with respect to one of the input shaft and the output.

16. The multiple gear transmission according to claim 6, wherein a tilted position of the freewheel teeth on the axles is held by the permanent magnet.

17. The multiple gear transmission according to claim 16, wherein the permanent magnet is inserted into one of the input shaft and the output on which the clutch mechanism is located.

18. The multiple gear transmission according to claim 1, wherein a positive rotationally fixed connection between one of the input shaft and the output and transmission wheel are cancelled with aid of energy that is stored before disengagement in the magnetic field.

19. The multiple gear transmission according to claim 1, wherein the change of the additional magnetic field is performed by electromagnets inside or in direct vicinity of the clutch mechanism.

20. The multiple gear transmission according to claim 1, wherein the frame of the transmission is embodied as a closed housing.

21. The multiple gear transmission according to claim 1, wherein the transmission gear ratios located between the input shaft and the output shaft are embodied as the belt and chain drive with toothed belts as belts and with toothed belt pulleys as the transmission wheels.

22. The multiple gear transmission according to claim 21, wherein the belts are reinforced by aramid, Kevlar or carbon-fiber materials.

23. The multiple gear transmission according to claim 22, wherein the fiber materials are encased in polyurethane.

24. The multiple gear transmission according to claim 21, wherein during no-load rotation on the toothed belt the belt is pressed by at least one pressing component into a kidney shaped form and under load impact the at least one pressing component does not touch the belt.

25. The multiple gear transmission according to claim 24, wherein the kidney-like form of the belt during no-load rotation is formed by a convex curvature of a driving side and by a concave curvature of a slack side.

26. The multiple gear transmission according to claim 24, wherein the kidney-like form of the belt under load is formed by a straight form of a driving side and by an intensified concave curvature of a slack side.

27. The multiple gear transmission according to claim 21, wherein the belts change belt tension during shifting operation.

28. The multiple gear transmission according to claim 21, wherein the belts change chain wraparound on the toothed belt during shifting operation.

29. The multiple gear transmission according to claim 24, wherein the at least one pressing component that presses the belt into the kidney-shaped form is a roll.

30. The multiple gear transmission according to claim 24, wherein additional guides are located on a slack side without contact in direct vicinity of the toothed belts and are shaped in a similar manner to the outer contour of the toothed belt.

31. The multiple gear transmission according to claim 24, wherein the clutch mechanism is a positive clutch mechanism.

32. A multiple gear transmission with magnetic control for vehicles or for use in drive technology comprising a clutch mechanism comprising at least one component having properties of a permanent magnet with a magnetic north and south pole, wherein a state of the clutch mechanism changes through a change of a magnetic field within or in a direct vicinity of the clutch mechanism and during at least one shifting operation the state of at least two clutch mechanisms change simultaneously and at least one of the two clutch mechanisms transfer only torques in one direction of rotation and only magnetic fields are changed to change gears, thereby being configured to shift gears under load and at stop during the shifting operation.

33. The multiple gear transmission according to claim 32, wherein a torque-transmitting component is always engaged between two gears during shifting of the gears.

34. The multiple gear transmission according to claim 32, wherein control of the multiple gear transmission is realized by a change of the magnetic field achieved through axial displacement of permanent magnets along a rotational axis of a shaft on which the clutch mechanism is located.

35. The multiple gear transmission according to claim 34, wherein freedom from vibrations from outside components is achieved by a tilted position of a freewheel tooth on a steel axle held by one of the permanent magnets.

* * * * *